(12) United States Patent
Shikfa et al.

(10) Patent No.: US 9,135,454 B2
(45) Date of Patent: Sep. 15, 2015

(54) SYSTEMS AND METHODS FOR ENABLING SEARCHABLE ENCRYPTION

(71) Applicant: Alcatel-Lucent, Paris (FR)

(72) Inventors: Abdullatif Shikfa, Villebon-sur-Yvette (FR); Serge Papillon, Paris (FR)

(73) Assignee: Alcatel Lucent, Boulogne-Billancourt (FR)

(*) Notice: Subject to any disclaimer, the term of this patent is extended or adjusted under 35 U.S.C. 154(b) by 134 days.

(21) Appl. No.: 13/907,044

(22) Filed: May 31, 2013

(65) Prior Publication Data
US 2014/0359282 A1    Dec. 4, 2014

(51) Int. Cl.
  *G06F 21/60*  (2013.01)
  *G06F 21/62*  (2013.01)

(52) U.S. Cl.
  CPC .......... *G06F 21/602* (2013.01); *G06F 21/6227* (2013.01)

(58) Field of Classification Search
  CPC .............. G06F 21/602; G06F 21/6209; G06F 21/6218; G06F 17/30622; G06F 17/30091; G06F 17/30864; G06F 17/30896; G06F 9/468; G06F 9/5011; G06F 2209/5011; G06F 17/30619; G06F 9/002; G06F 9/0894; G06F 9/00; H04L 9/002; H04L 9/0894
  USPC .................. 713/150, 165, 167, 189
  See application file for complete search history.

(56) References Cited

U.S. PATENT DOCUMENTS

| 2006/0101285 | A1* | 5/2006 | Chen et al. ................... 713/193 |
| 2010/0332401 | A1* | 12/2010 | Prahlad et al. ................. 705/80 |
| 2011/0119481 | A1* | 5/2011 | Auradkar et al. ............. 713/150 |
| 2013/0046974 | A1* | 2/2013 | Kamara et al. ................ 713/165 |
| 2013/0067225 | A1* | 3/2013 | Shochet et al. ............... 713/165 |

OTHER PUBLICATIONS

Boolean symmetric searchable encryption, by Tarik Moataz and Abdullatif Shikfa.2013. In Proceedings of the 8th ACM SIGSAC symposium on Information, computer and communications security (ASIA CCS '13). ACM, New York, NY, USA, 265-276.
Semantic Search Over Encrypted Data, by Tarik Moataz; Abdullatif Shikfa; Nora Cuppens-Boulahia and Frédéric Cuppens. 2013. In Proceedings of the 20th IEEE International Conference on Telecommunications (ICT 2013).

* cited by examiner

*Primary Examiner* — Chau Le
*Assistant Examiner* — Don Zhao
(74) *Attorney, Agent, or Firm* — McCormick, Paulding & Huber LLP

(57) ABSTRACT

A system and method for enabling searchable encryption of encrypted documents stored by a client on one or more storage providers includes a broker server in communication with the client and the one or more storage providers. The broker server is adapted to transfer the encrypted documents between the client and the one or more storage providers and to maintain information indicating where the encrypted documents are transferred. The broker server further stores information for at least one encrypted index for the encrypted documents and a test function for a searchable encryption mechanism used to encrypt the at least one encrypted index.

20 Claims, 4 Drawing Sheets

SYSTEMS AND METHODS FOR ENABLING SEARCHABLE ENCRYPTION

FIELD OF THE INVENTION

The present invention relates to data storage.

BACKGROUND OF THE INVENTION

Many cloud-based services (e.g. data storage, webmail services, advertising, geolocation services, and the like) provide the ability to operate on a client's stored data (e.g. files, email, location, etc.) by providing access to the stored data. This allows the client to search for specific pieces of data stored using the cloud-based services. However, this ability to operate on the client's stored data may be at odds with the client's data privacy needs, which often require encryption to protect the data, because many storage providers do not support searchable encryption. Therefore, the client's ability to operate on encrypted data that is stored by one or more cloud storage providers can be limited.

SUMMARY

According to an embodiment, a broker system enables searchable encryption of encrypted documents stored by a client on one or more storage providers. The broker system includes a broker server in communication with the client and the storage providers. The broker server is adapted to transfer the encrypted documents between the client and the storage providers and to maintain a table indicating the encrypted documents that are transferred to each storage provider. The broker server also stores information for at least one encrypted index for the encrypted documents and a test function for a searchable encryption mechanism used to encrypt the at least one encrypted index.

According to an embodiment, the information for the at least one encrypted index is the encrypted index.

According to an embodiment, the broker server transfers the at least one encrypted index to the one or more storage providers and the information for the at least one encrypted index is a table indicating the encrypted indexes that are transferred to each storage provider.

According to an embodiment, the broker server is in communication with a plurality of clients.

According to an embodiment, the broker server is adapted to send a particular encrypted document to at least two storage providers to provide redundancy.

According to an embodiment, the broker server executes the test function upon receipt of an encrypted query from the client.

According to an embodiment, the broker server uses the encrypted query and the encrypted index as input for the test function.

According to an embodiment, a computerized method for enabling searchable encryption of encrypted documents stored on at least one storage provider by a client includes receiving, at a broker server, the encrypted documents, at least one encrypted index for the encrypted documents, the encrypted index being encrypted by a searchable encryption mechanism, and identification of the searchable encryption mechanism used to encrypt the encrypted index. The method further includes sending the encrypted documents to the at least one storage provider and maintaining, at the broker server, a translation table indicating the encrypted documents that are transferred to each storage provider. The method also includes storing, at the broker server, information relating to the at least one encrypted index and a test function for the searchable encryption mechanism used to encrypt the encrypted index.

According to an embodiment, the computerized method may additionally comprise the steps of sending the at least one encrypted index to the storage provider and maintaining, at the broker server, a second translation table indicating the encrypted indexes that are transferred to each storage provider.

According to an embodiment, the computerized method may additionally comprise the steps of receiving, at the broker server, an encrypted query from the client to be searched and executing, at the broker server, the test function for the searchable encryption mechanism using the encrypted query and the encrypted index. The method further comprises transferring, by the broker server, encrypted documents returned from the test function as satisfying the encrypted query from the at least one storage provider to the client.

According to an embodiment, the computerized method may also comprise the steps of sending the at least one encrypted index to the storage provider and maintaining, at the broker server, a second translation table indicating the encrypted indexes that are transferred to each storage provider. The method may also comprise retrieving the at least one encrypted index from the at least one storage provider.

According to an embodiment, the broker server may be in communication with a plurality of storage providers.

According to an embodiment, the broker server may be in communication with a plurality of clients.

According to an embodiment, the step of sending the encrypted documents to the storage provider may include sending a particular encrypted document to at least two storage providers to provide redundancy.

According to an embodiment, a non-transitory, tangible computer-readable medium stores instructions adapted to be executed by a computer processor at a broker server to enable searchable encryption of encrypted documents stored on at least one storage provider by a client to perform a method comprising the steps of receiving, at a broker server, the encrypted documents, at least one encrypted index for the encrypted documents, the encrypted index being encrypted by a searchable encryption mechanism, and identification of the searchable encryption mechanism used to encrypt the encrypted index. The method further includes sending the encrypted documents to the at least one storage provider and maintaining, at the broker server, a translation table indicating the encrypted documents that are transferred to each storage provider. The method also includes storing, at the broker server, information relating to the at least one encrypted index and a test function for the searchable encryption mechanism used to encrypt the encrypted index.

According to an embodiment, the method may further comprise the steps of sending the at least one encrypted index to the storage provider and maintaining, at the broker server, a second translation table indicating the encrypted indexes that are transferred to each storage provider.

According to an embodiment, the method may further comprise the steps of receiving, at the broker server, an encrypted query from the client to be searched and executing, at the broker server, the test function for the searchable encryption mechanism using the encrypted query and the encrypted index. The method may further comprise transferring, by the broker server, encrypted documents returned from the test function as satisfying the encrypted query from the at least one storage provider to the client.

According to an embodiment, the method may also comprise the steps of sending the at least one encrypted index to the storage provider and maintaining, at the broker server, a second translation table indicating the encrypted indexes that are transferred to each storage provider. The method may also comprise retrieving the at least one encrypted index from the at least one storage provider.

According to an embodiment, the broker server may be in communication with a plurality of storage providers.

According to an embodiment, the step of sending the encrypted documents to the storage provider may include sending a particular encrypted document to at least two storage providers to provide redundancy.

These and other embodiments of will become apparent in light of the following detailed description herein, with reference to the accompanying drawings.

DETAILED DESCRIPTION

Figure 1:
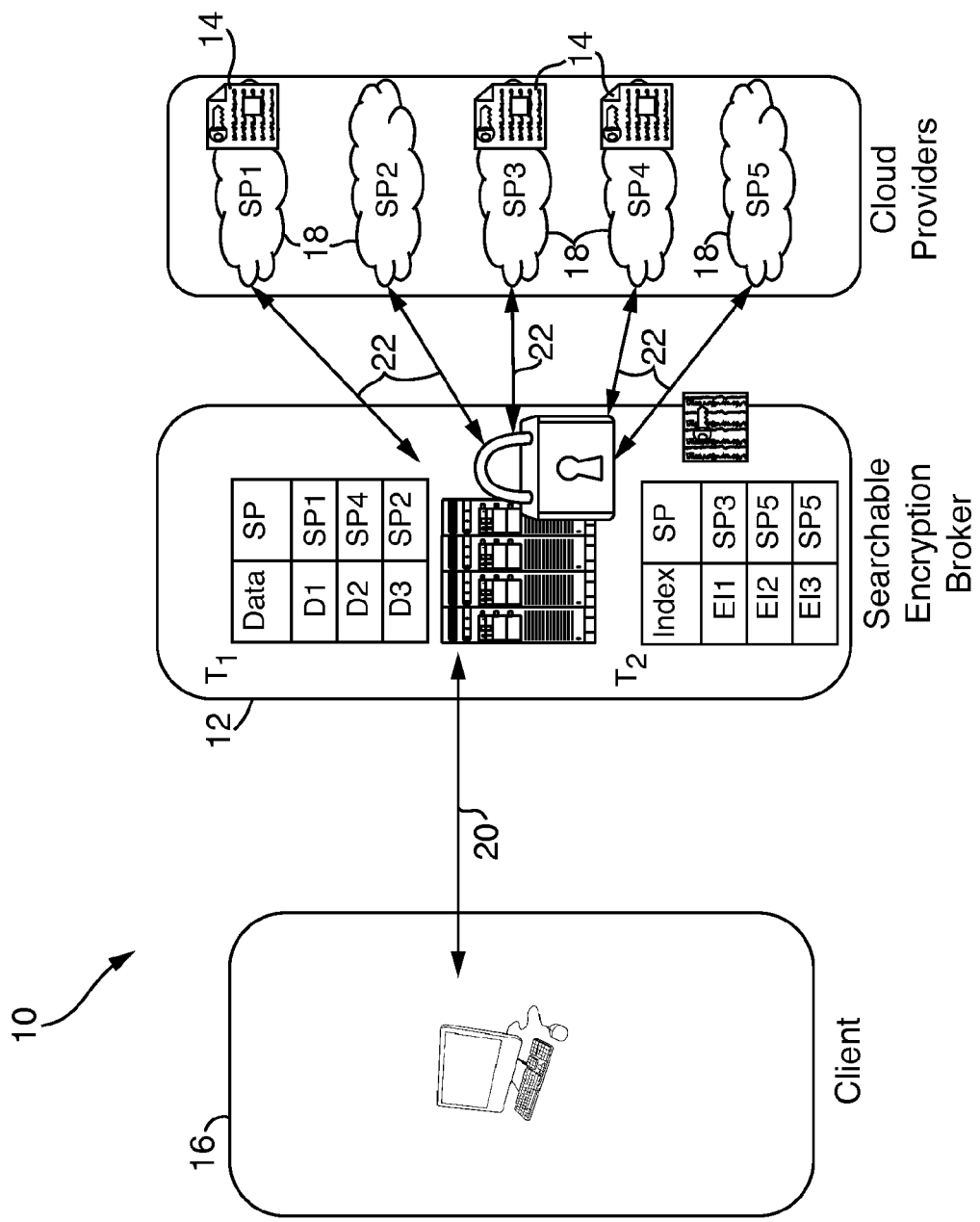
FIG. 1 is a schematic diagram of a broker system according to an embodiment.

Referring to FIG. 1, a broker system 10 includes a broker server 12 that enables searchable encryption of encrypted documents 14 stored by a client 16 on one or more cloud storage providers 18. The broker server 12 is in communication with the client 16 over a first communication link 20 that allows the broker server 12 and client 16 to transfer data, such as the encrypted documents 14 (e.g. files, documents, email, location data, or any other similar data), therebetween. The broker server 12 is also in communication with each cloud storage provider 18 over second communication links 22 that also allows the broker server 12 and the one or more cloud storage providers 18 to transfer data, such as the encrypted documents 14, therebetween. The first communication link 20 and the second communication links 22 may be any suitable communication network for connecting electronic devices, such as a computer network that may include connections across the World Wide Web. The broker server 12 acts as an intermediary between the client 16 and the cloud storage provider 18 to provide searchable encryption so that client may execute encrypted searches of the encrypted documents 14.

Figure 2:
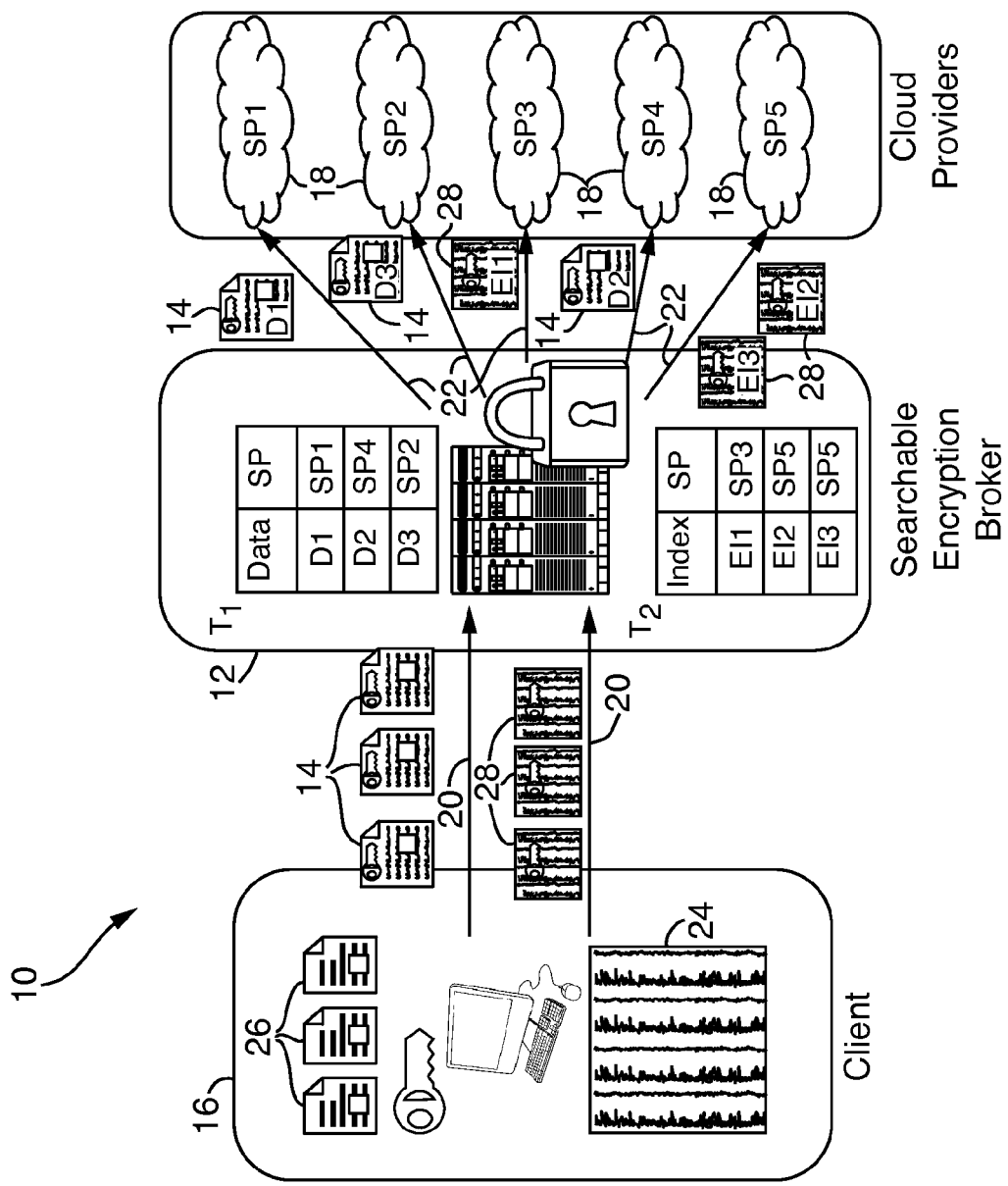
FIG. 2 is a schematic diagram of an embodiment for providing searchable encryption through the broker system of FIG. 1.

Referring to FIG. 2, for the broker system 10 to provide searchable encryption at the broker server 12, the client 16 generates one or more indexes 24 for one or more documents 26 that are to be encrypted as encrypted documents 14 and stored on the storage providers 18. Each index 24 includes one or more keywords for the encrypted documents 14 and pointers to the encrypted documents 14 containing the keywords. The client 16 encrypts the one or more documents 26 using any desired encryption mechanism known in the art to provide the encrypted documents 14. The client 16 encrypts the one or more indexes 24 using a searchable encryption mechanism to generate one or more encrypted indexes 28. The searchable encryption mechanism used to encrypt the indexes 24 may be any searchable encryption mechanism known in the art and is typically different than the encryption mechanism used to encrypt the documents 26 since the searchable encryption mechanism is specific to searchable encryption. Exemplary searchable encryption mechanisms are described in the article *Boolean symmetric searchable encryption*, by Tarik Moataz and Abdullatif Shikfa. 2013. In Proceedings of the 8th ACM SIGSAC symposium on Information, computer and communications security (ASIA CCS '13). ACM, New York, N.Y., USA, 265-276, and in the article *Semantic Search Over Encrypted Data*, by Tarik Moataz; Abdullatif Shikfa; Nora Cuppens-Boulahia and Frédéric Cuppens. 2013. In Proceedings of the 20th IEEE International Conference on Telecommunications (ICT 2013), which are both hereby incorporated by reference in their entireties. As should be understood by those skilled in the art, the broker system 10 may work with any searchable encryption mechanism and is not limited to the exemplary mechanisms described in the articles referenced above. The number of encrypted indexes 28 generated by the client 16 for a particular number of encrypted documents 14 may depend on the specific searchable encryption mechanism used to encrypt the index 24. For example, some searchable encryption mechanisms may generate one encrypted index 28 per encrypted document 14, while other searchable encryption mechanisms may generate a single encrypted index 28 for all of the encrypted documents 14. The specific encryption mechanism for encrypting the documents 26 and the specific searchable encryption mechanism for searchably encrypting the one or more indexes 24 are not described in detail as a variety of encryption mechanisms and searchable encryption mechanisms should be known to those skilled in the art.

The client 16 sends the encrypted documents 14 and the corresponding encrypted index 28 (which may be one or several indexes depending on the searchable encryption mechanism used) to the broker server 12 over the first communication link 20. The client 16 also informs the broker server 12 of the searchable encryption mechanism used to encrypt the encrypted indexes 28 over the communication link 20, which allows the broker module 12 to execute a test function for the searchable encryption mechanism to search the encrypted documents 14 as will be discussed below.

The broker server 12 receives the encrypted documents 14, the encrypted index(es) 28, and the information on the searchable encryption mechanism from the client 16. The broker server 12 sends the encrypted documents 14 to the cloud storage providers 18 since the broker server 12 relies on the cloud storage providers 18 to store data. The broker server 12 generates and stores in memory a translation table T1 indicating which encrypted documents 14 (e.g. D1, D2, D3, etc) are stored on which cloud storage provider 18 (e.g. SP1, SP2, SP3, SP4, SP5, etc.). The broker server 12 may transmit one or more of the encrypted documents 14 to more than one cloud storage provider 18. In this case, the translation table T1 may be generated/updated to indicate that a particular encrypted document 14 (e.g., D1) is stored on multiple cloud storage providers 18 (e.g., SP1, SP2).

The broker server 12 may store the encrypted index(es) 28 directly in a locally accessible memory or may send the encrypted index(es) 28 to one or more of the cloud storage providers 18 to minimize storage requirements for local memory. When the broker server 12 sends the encrypted index(es) 28 to one or more of the cloud storage providers 18, the broker server 12 generates and stores in memory a translation table T2 indicating which encrypted index(es) (e.g. E11, E12, E13, etc.) are stored on which cloud storage provider 18 (e.g. SP1, SP2, SP3, SP4, SP5, etc.). As with the encrypted documents 14, the broker server 12 may send one or more of the encrypted index(es) for storage on multiple cloud storage providers.

The broker server 12 also stores the information on the searchable encryption mechanism from the client 16 used to searchably encrypt the encrypted index(es) 28 in local memory. The broker server 12 uses the information on the searchable encryption mechanism to perform searches of the encrypted documents 14, as discussed in greater detail below.

Figure 3:
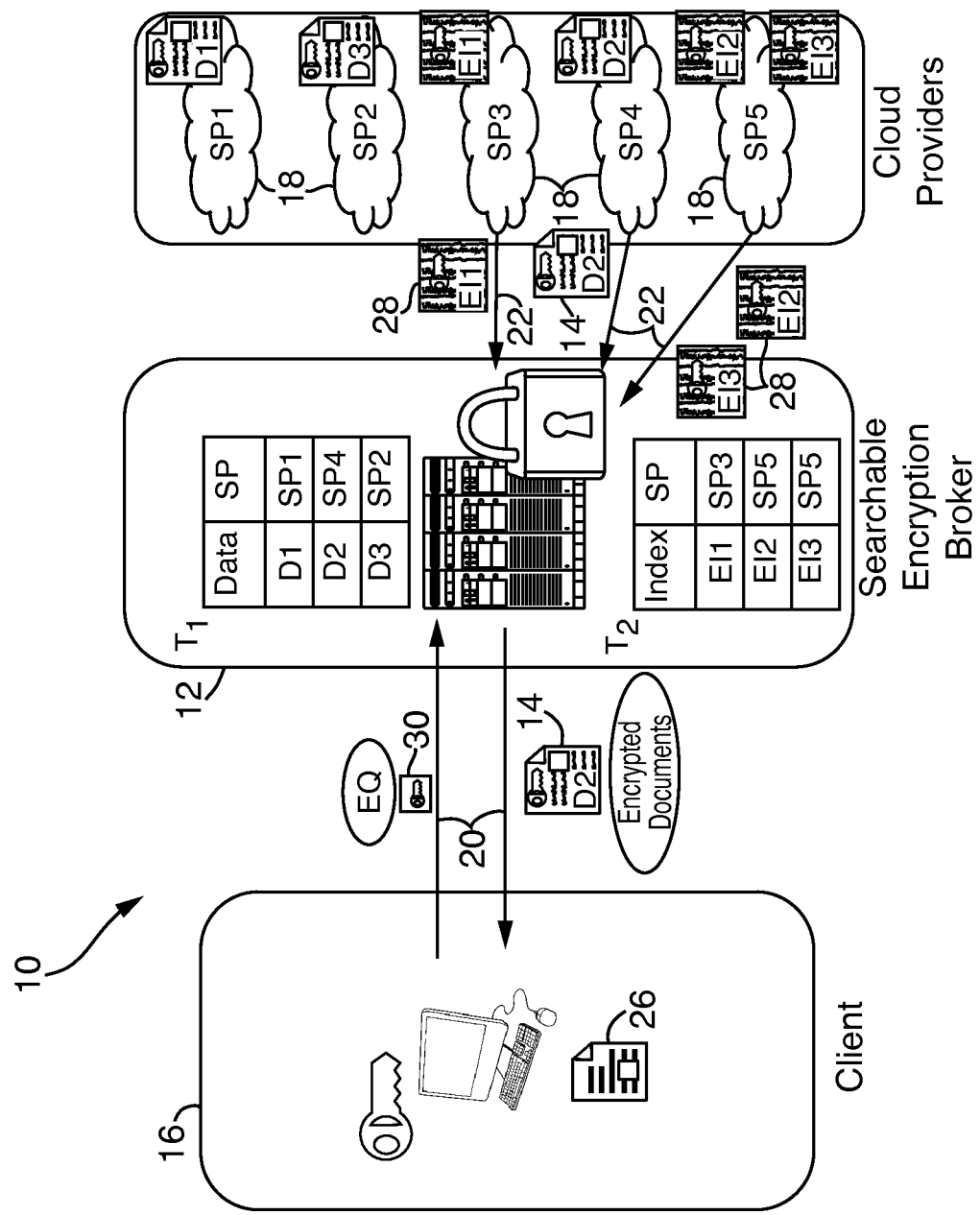
FIG. 3 is a schematic diagram of an embodiment for executing an encrypted query through the broker system of FIG. 1.

Referring to FIG. 3, when the client 16 wants to search for a encrypted document 14 containing one or more keywords, the client 16 generates an encrypted search query 30 for the keywords as per the searchable encryption mechanism used to encrypt the encrypted index(es) 28 and sends the encrypted query 30 to the broker server 12 over the communication link 20.

When the broker server 12 receives the encrypted search query 30 from the client 16, the broker server 12 implements the specific test function for the specific searchable encryption mechanism to determine which encrypted documents 14 corresponds to the encrypted query 30, if any. As discussed above, the broker server 12 knows which specific test function to select and apply for the specific searchable encryption mechanism because the client 16 previously provided the broker server 12 with the information on the searchable encryption mechanism used to encrypt the encrypted index(es) 28.

The specific test function selected for the specific searchable encryption mechanism uses the encrypted query 30 and the encrypted index(es) 28 as input for its determination. Thus, when the broker server 12 receives the encrypted query 30 from the client 16, the broker server 12 only obtains the encrypted index(es) 28 for that client 16 to execute the specific test function. As discussed above, in some embodiments, the encrypted index(es) 28 may be stored locally in memory on the broker server 12 and, therefore, may be readily available. In other embodiments, where the encrypted index(es) 28 is stored at one or more cloud storage providers 18, the broker server 12 may use the translation table T2 stored in local memory to retrieve the encrypted index(es) 28 from the cloud storage provider 18 at which it was stored using the second communication links 22. For example, in the exemplary embodiment of FIG. 3, the broker server 12 retrieves encrypted indexes E11, E12 and E13. The broker server 12 then applies the specific test function for the searchable encryption mechanism to the encrypted indexes, which returns identifiers (e.g. D1, D2, D3, etc.) of the one or more encrypted documents 14 that satisfy the encrypted query 30. For example, in the exemplary embodiment of FIG. 3, the test function returns identifier D2. The broker server 12 uses the translation table T1, which is stored in local memory, to look up the identifier(s) returned by the test function (e.g. D2) and then retrieves the corresponding encrypted document(s) 14 from the storage providers 18 according to standard methods (e.g. using the storage provider's application program interface) over the second communication link(s) 22. The broker server 12 then returns the retrieved encrypted document(s) 14 to the client 16 over the first communication link 20. The client 16 may then unencrypt the encrypted document(s) 14 since the client 16 knows the encryption that was used to initially encrypt the document 26.

Thus, the broker server 12 allows clients 16 to store encrypted (i.e. secure) documents 14 on cloud storage providers 18 by providing searchable encryption that enables the clients 16 to search and retrieve the encrypted documents 14. In order to provide the searchable encryption, the broker server 12 needs to locally store only the translation table T1, the translation table T2 (or the encrypted index(es) 28), and the test function for the at least one searchable encryption mechanism.

Additionally, the broker server 12 may act as an aggregator of searchable encryption mechanisms to support many different searchable encryption mechanisms by storing test functions for the many different searchable encryption mechanisms in local memory. The clients 16 may then select which searchable encryption mechanism best suits their security needs when using the broker server 12 to store encrypted documents 14 on cloud storage providers 18.

Figure 4:
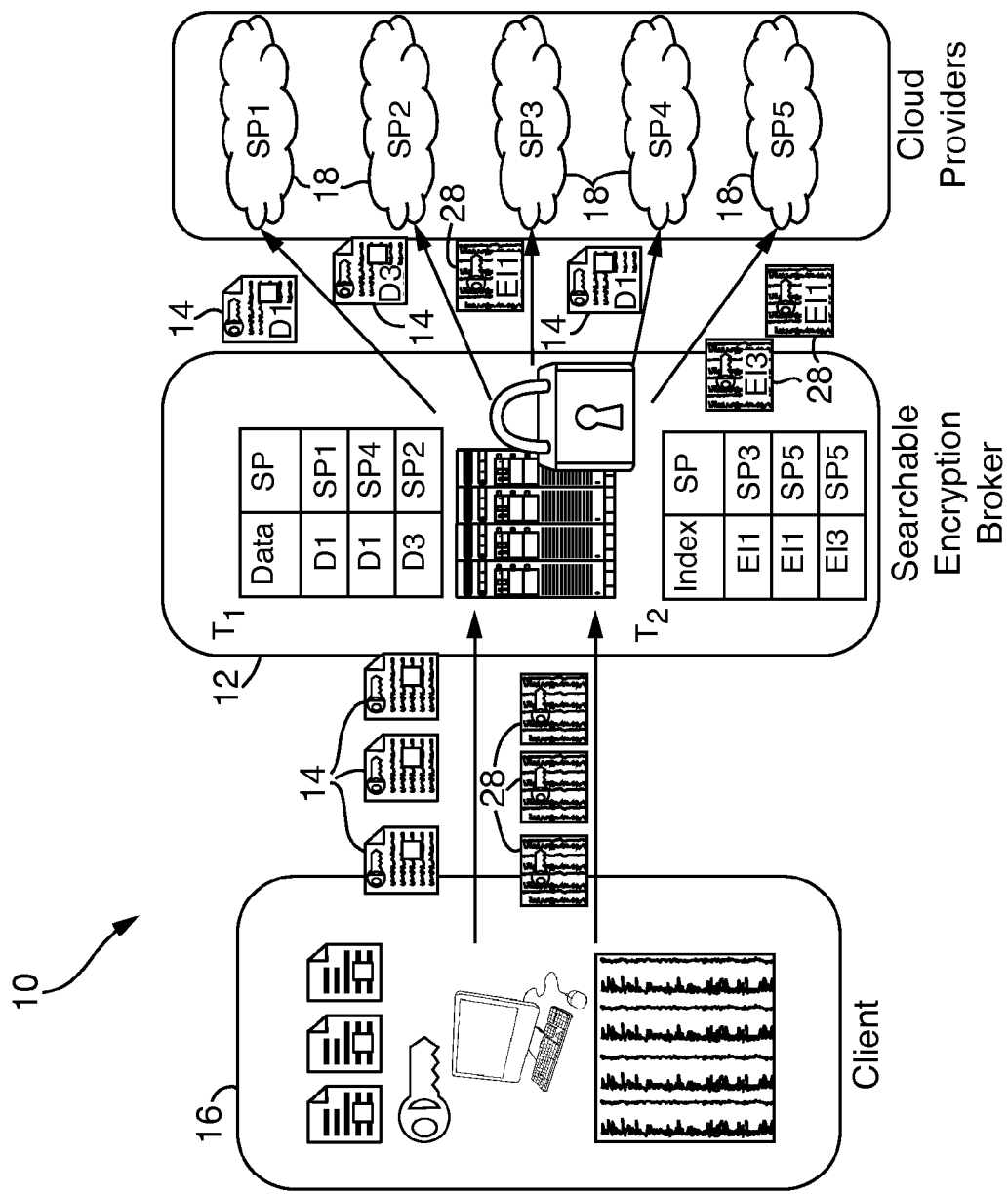
FIG. 4 is a schematic diagram of an embodiment for redundantly storing data through the broker system of FIG. 1.

Referring to FIG. 4, in embodiments, the broker server 12 may also provide redundancy when storing data from clients 16 by storing specific encrypted documents 14, encrypted indexes 28, or parts thereof, on multiple cloud storage providers 18 to guarantee availability of the stored data, particularly in case there are defects at one or more storage providers 18. For example, in embodiments, the broker system 10 may implement an error correcting code to correct defects of a particular storage provider 18 when transferring the encrypted documents 14 to the broker server 12, as should be understood by those skilled in the art, so that the data being stored on any particular storage provider 18 may be a function of part of a particular encrypted document. In the exemplary embodiment of FIG. 4, the broker server 12 stores the encrypted document D1 on storage providers SP1 and SP4 and stores the encrypted index E11 on storage provider SP3 and SP5. In these embodiments, the broker server 12 extends the translation table T1 and the translation table T2, if the encrypted indexes 28 are being stored on storage providers 18, to encompass the case of several storage providers 18 are storing the same encrypted documents 14 or indexes 28. If the broker server 12 redundantly stores parts or portions of specific encrypted documents 14 and/or specific encrypted indexes 28 on different storage providers 18, the translation tables T1 and T2 should also be extended to include how the parts or portions of the specific encrypted documents 14 and/or specific encrypted indexes 28 are recombined.

The broker server 12 may update the translation tables T1 and T2 at each action on the storage side (i.e. each time the broker server 12 stores another encrypted document 14, encrypted index 28, or portion thereof, on one or more of the storage providers 18). For example, if the broker server 12 determines that a particular storage provider 18 is defective, the broker module 12 may store the data, or any portion thereof, that was stored on the defective storage provider 18 on another storage provider 18 to maintain redundancy. The broker server 12 then updates the translation tables T1 and T2 to reflect this modification.

Although the broker server 12 has been described above as being separate from the storage providers 18 and in communication with a plurality of storage provider 18 over second communication links 22, in embodiments, the broker server 12 may, itself, be a storage provider 18 and may provide similar functionality to that discussed herein.

The broker system 10 has the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the broker server 12 may include at least one processor, system memory, including random access memory (RAM) and read-only memory (ROM), an input/output controller, and one or more data storage structures. All of these latter elements are in communication with the at least one processor to facilitate the operation of the broker server 12 as discussed above. Suitable computer program code may be provided for executing numerous functions, including those discussed above in connection with the broker server 12, client 16 and storage provider 18. The computer program code may also include program elements such as an operating system, a database management system and "device drivers" that allow the broker server 12, client 16 and storage provider 18 to interface with computer peripheral devices (e.g., a video display, a keyboard, a computer mouse, etc.).

The at least one processor of the broker server 12 may include one or more conventional microprocessors and one or more supplementary co-processors such as math co-processors or the like. The processor may be in communication with a communication interface unit, which may include multiple communication channels, e.g. the first communication link 20 and the second communication link 22 for simultaneous communication with one or more clients 16 and one or more storage providers 18, which may each include other processors, servers or operators. Devices in communication with each other need not be continually transmitting to each other. On the contrary, such devices need transmit to each other as necessary, may actually refrain from exchanging data most of the time, and may require several steps to be performed to establish a communication link between the devices.

The data storage structures discussed herein may comprise an appropriate combination of magnetic, optical and/or semiconductor memory, and may include, for example, RAM, ROM, flash drive, an optical disc such as a compact disc and/or a hard disk or drive. The data storage structures may store, for example, information required by the broker server 12 and/or one or more programs (e.g., computer program code and/or a computer program product) adapted to direct the broker server 12 to provide searchable encryption according to the various embodiments discussed herein. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor of the broker system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device (e.g., a server) can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

The broker system 10 provides searchable encryption by storing only the translation table T1, the translation table T2 (or the encrypted index(es) 28), and the test function for the at least one searchable encryption mechanism on the broker server 12 acting as an intermediary between the client 16 and the one or more storage providers 18. The broker system 10 makes searchable encryption practical to use on top of legacy storage solutions (e.g. storage providers) that do not support searchable encryption. The broker system 10 also ensures that the broker server 12 cannot access and/or discover the content of the client's data because the broker server 12 does not know the encryption used on the encrypted documents 14. Thus, the broker system 10 provides searchable encryption while maintaining the confidentiality of data external to the client 16.

The broker system 10 may also provide for the use of multiple forms of searchable encryption mechanisms, without any change at the cloud storage providers 18, since the broker system 12 acts as the intermediary between the client(s) 16 and the cloud storage providers 18 and since the broker may store multiple test functions for multiple searchable encryption mechanisms.

The broker system 10 advantageously provides searchable encryption without requiring any such capability at the storage provider 18. Thus, the client 16 may freely store encrypted documents 14 at any storage provider 18 without having to worry about the searchability of the encrypted documents 14. Thus, the client 16 does not have to compromise its privacy needs to accommodate document searchability.

Although this invention has been shown and described with respect to the detailed embodiments thereof, it will be understood by those skilled in the art that various changes in form and detail thereof may be made without departing from the spirit and the scope of the invention.

What is claimed is:

1. A broker system enabling searchable encryption of encrypted documents stored by a client on one or more storage providers, the broker system comprising:
   a broker server in communication with the client and the one or more storage providers, the broker server including at least one processor and a memory allowing the broker server to transfer the encrypted documents between the client and the one or more storage providers and to maintain, through the at least one processor, a first translation table indicating the encrypted documents that are transferred to each storage provider of the one or more storage providers;
   wherein the broker server stores, in the memory, information for at least one encrypted index for the encrypted documents and
   a plurality of test functions for searchable encryption mechanisms, including a first test function for a searchable encryption mechanism used to encrypt the at least one encrypted index; and
   wherein the at least one processor of the broker server responds to queries of the encrypted documents from the client that encrypted the documents stored by the broker server on the one or more storage providers by selecting the first test function from the plurality of test functions based on information provided by the client and applying the first test function to the queries and the at least one encrypted index.

2. The broker system according to claim 1, wherein the information for the at least one encrypted index is the encrypted index.

3. The broker system according to claim 1, wherein the broker server transfers the at least one encrypted index to the one or more storage providers; and
   wherein the information for the at least one encrypted index is a second translation table indicating the encrypted indexes that are transferred to each storage provider of the one or more storage providers.

4. The broker system according to claim 1, wherein the broker server is in communication with a plurality of clients.

5. The broker system according to claim 1, wherein the broker server is adapted to send a particular encrypted document to at least two storage providers to provide redundancy.

6. The broker system according to claim 1, wherein the broker server executes the test function upon receipt of an encrypted query from the client.

7. The broker system according to claim 6, wherein the broker server uses the encrypted query and the encrypted index as input for the test function.

8. A computerized method for enabling searchable encryption of encrypted documents stored on at least one storage provider by a client, the computerized method comprising:
   receiving, at a broker server, the encrypted documents, at least one encrypted index for the encrypted documents, the encrypted index being encrypted by a searchable encryption mechanism, and identification of the searchable encryption mechanism used to encrypt the encrypted index;
   sending the encrypted documents to the at least one storage provider;
   maintaining, at the broker server, a translation table indicating the encrypted documents that are transferred to each storage provider of the at least one storage provider;
   storing, at the broker server, information relating to the at least one encrypted index and a plurality of test functions for searchable encryption mechanisms, including a first test function for the searchable encryption mechanism used to encrypt the encrypted index; and
   responding, by the broker server, to a query of the encrypted documents from the client that encrypted the documents stored by the broker server on the at least one storage provider by selecting the first test function from the plurality of test functions based on information provided by the client and applying the first test function to the query and the at least one encrypted index.

9. The computerized method according to claim 8, additionally comprising:
   sending the at least one encrypted index to the storage provider; and
   maintaining, at the broker server, a second translation table indicating the encrypted indexes that are transferred to each storage provider.

10. The computerized method according to claim 8, wherein responding, by the broker server, to a query includes:
    receiving, at the broker server, an encrypted query from the client to be searched;
    executing, at the broker server, the first test function for the searchable encryption mechanism using the encrypted query and the encrypted index; and
    transferring, by the broker server, encrypted documents returned from the first test function as satisfying the encrypted query from the at least one storage provider to the client.

11. The computerized method according to claim 10, additionally comprising:
    sending the at least one encrypted index to the storage provider; and
    maintaining, at the broker server, a second translation table indicating the encrypted indexes that are transferred to each storage provider of the at least one storage provider; and
    retrieving the at least one encrypted index from the at least one storage provider.

12. The computerized method according to claim 8, wherein the broker server is in communication with a plurality of storage providers.

13. The computerized method according to claim 8, wherein the broker server is in communication with a plurality of clients.

14. The computerized method according to claim 8, wherein sending the encrypted documents to the storage provider includes sending a particular encrypted document to at least two storage providers to provide redundancy.

15. A non-transitory, tangible computer-readable medium storing instructions adapted to be executed by a computer processor at a broker server to enable searchable encryption of encrypted documents stored on at least one storage provider by a client to perform a method comprising:
    receiving, at a broker server, the encrypted documents, at least one encrypted index for the encrypted documents, the encrypted index being encrypted by a searchable encryption mechanism, and identification of the searchable encryption mechanism used to encrypt the encrypted index;
    sending the encrypted documents to a storage provider of the at least one storage provider;
    maintaining, at the broker server, a translation table indicating the encrypted documents that are transferred to each storage provider of the at least one storage provider;
    storing, at the broker server, information relating to the at least one encrypted index and a plurality of test functions for searchable encryption mechanisms, including a first test function for the searchable encryption mechanism used to encrypt the encrypted index; and responding, by the broker server, to a query of the encrypted documents from the client that encrypted the documents stored by the broker server on the at least one storage provider by selecting the first test function from the plurality of test functions based on information provided by the client and applying the first test function to the query and the at least one encrypted index.

16. The non-transitory, tangible computer-readable medium of claim 15, wherein the method further comprises:

sending the at least one encrypted index to a storage provider of the at least one storage provider; and maintaining, at the broker server, a second translation table indicating the encrypted indexes that are transferred to each storage provider of the at least one storage provider.

17. The non-transitory, tangible computer-readable medium of claim 15, wherein responding, by the broker server, to a query includes:

receiving, at the broker server, an encrypted query from the client to be searched;

executing, at the broker server, the first test function for the searchable encryption mechanism using the encrypted query and the encrypted index; and transferring, by the broker server, encrypted documents returned from the first test function as satisfying the encrypted query from at least one storage provider of the at least one storage provider to the client.

18. The non-transitory, tangible computer-readable medium of claim 17, wherein the method further comprises:

sending the at least one encrypted index to a storage provider of the at least one storage provider; and maintaining, at the broker server, a second translation table indicating the encrypted indexes that are transferred to each storage provider of the at least one storage provider; and retrieving the at least one encrypted index from the at least one storage provider.

19. The non-transitory, tangible computer-readable medium of claim 15, wherein the broker server is in communication with a plurality of storage providers.

20. The non-transitory, tangible computer-readable medium of claim 14, wherein sending the encrypted documents to the at least one storage provider includes sending a particular encrypted document to at least two storage providers of the at least one storage provider to provide redundancy.

* * * * *